UNITED STATES PATENT OFFICE.

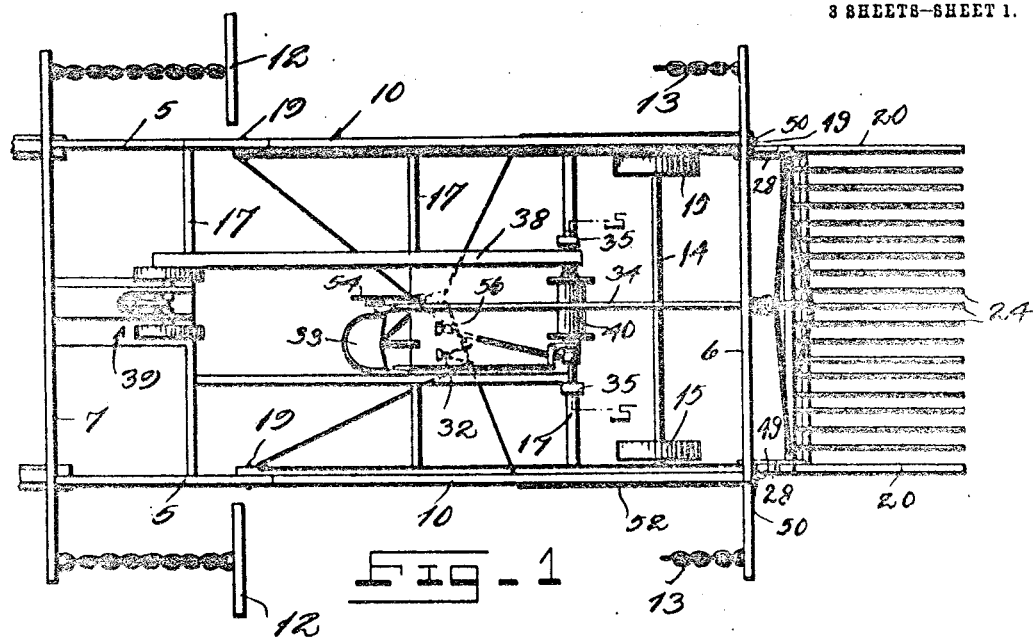

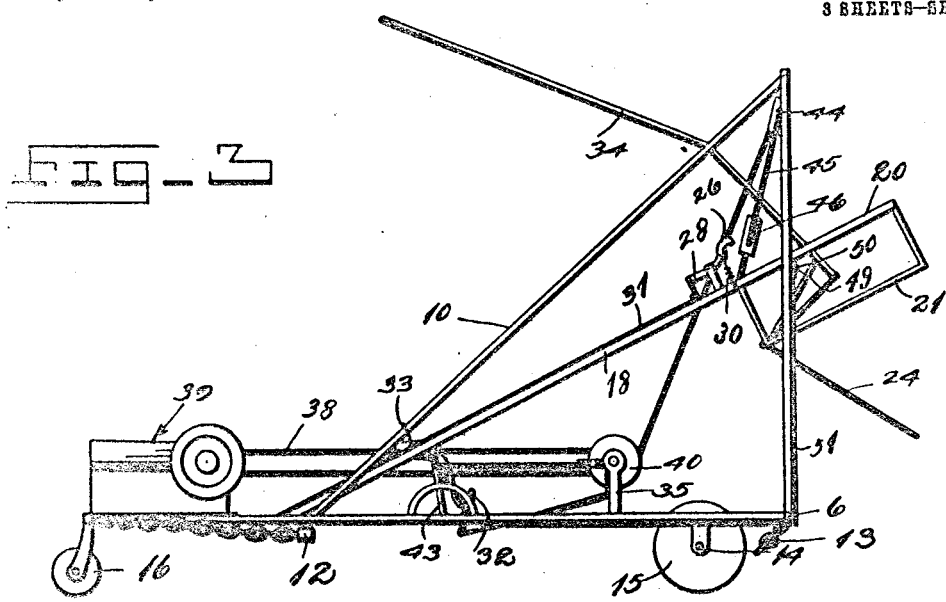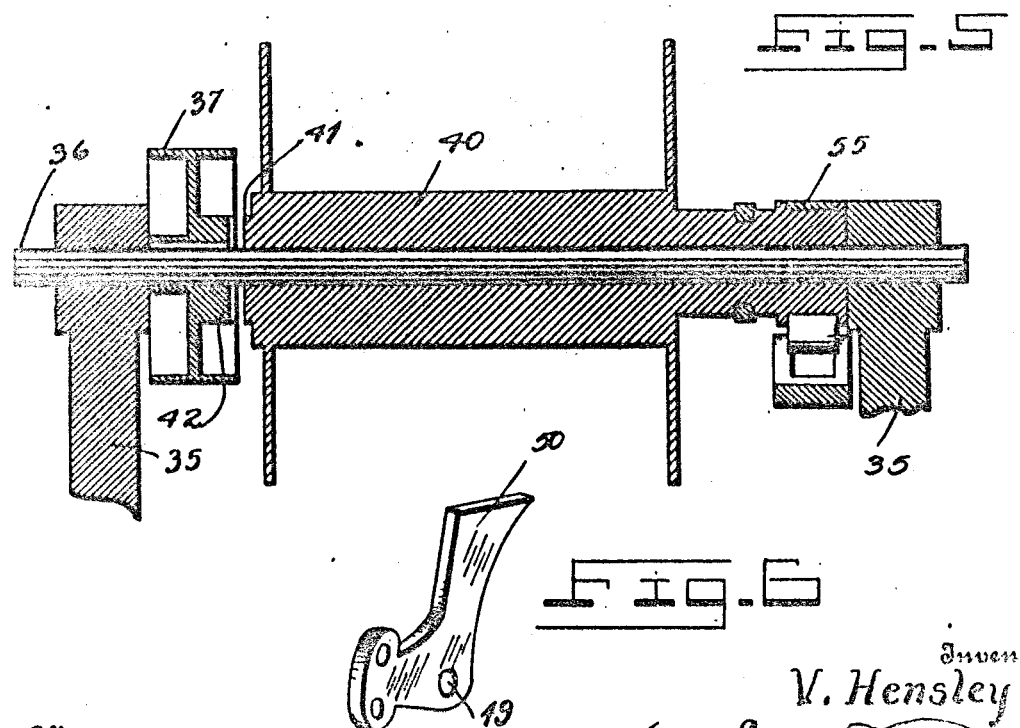

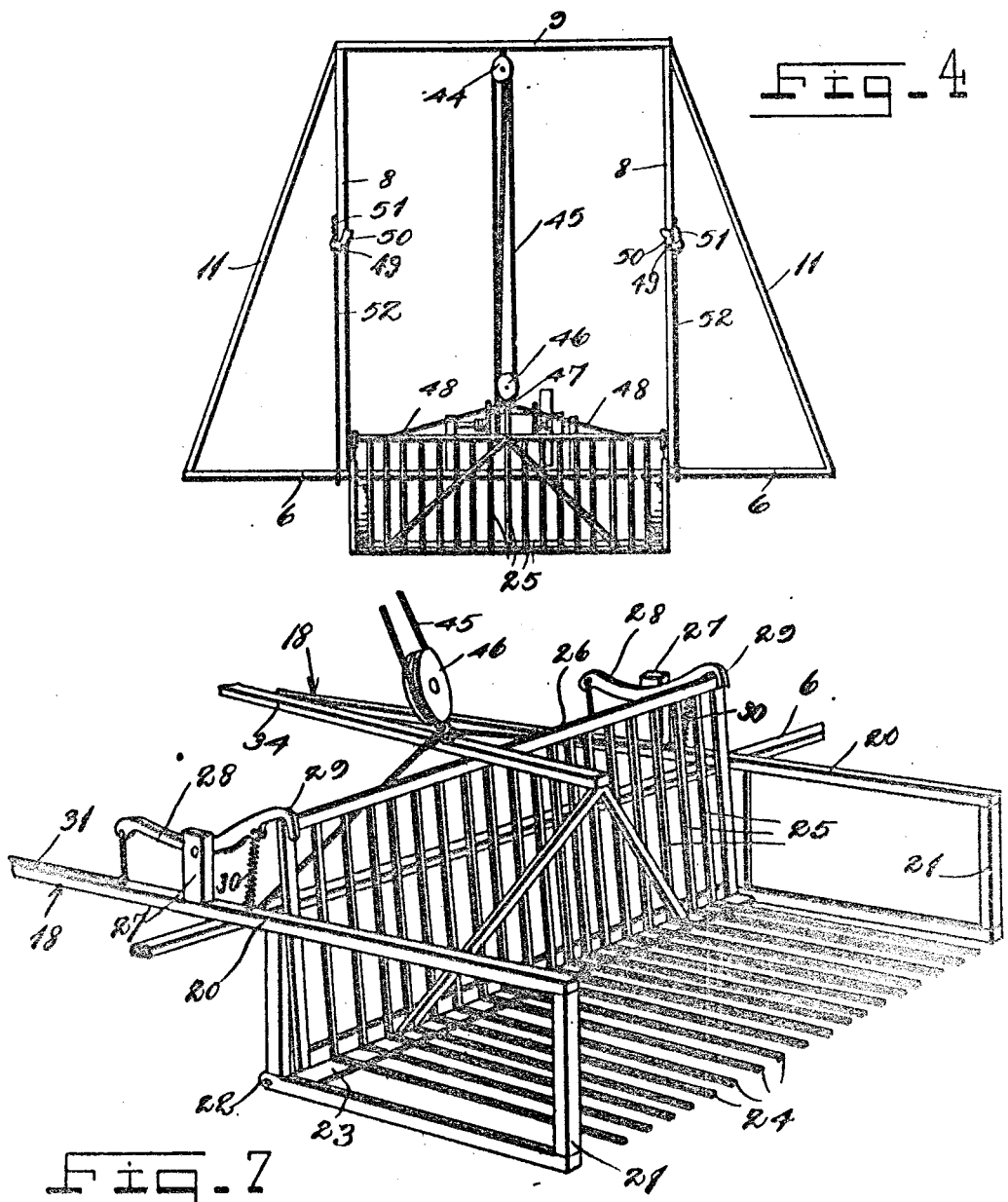

VERNE HENSLEY, OF CENTRAL CITY, NEBRASKA.

MANURE-LOADER.

1,045,842.　　　Specification of Letters Patent.　　Patented Dec. 3, 1912.

Application filed December 18, 1911. Serial No. 666,359.

*To all whom it may concern:*

Be it known that I, VERNE HENSLEY, a citizen of the United States, residing at Central City, in the county of Merrick and State of Nebraska, have invented certain new and useful Improvements in Manure-Loaders, of which the following is a specification.

This invention relates to an improvement in manure loaders of that type which is provided with an elevating rake.

The principal object of the invention is to provide a manure loader including a main frame, a rake frame mounted thereon to be elevated, a rake head swingingly mounted upon the rake frame, means to elevate said rake frame, locking means for the rake head, and means to control said locking means.

Another object of the invention is to provide a manure loader including a main frame and a rake frame of the type described, together with a novel form of mechanism for elevating said rake frame.

A further object of the invention is to provide a novel construction of main frame for loaders of the character described.

A still further object of the invention is to provide a loader for the purpose described, which is composed of a comparatively few number of parts, is therefore simple in construction, and is cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction within the scope of the claims, may be resorted to without departing from the spirit or sacrificing any of the advantages of the invention.

In the drawings: Figure 1 is a top plan view of a loader constructed in accordance with my invention, Fig. 2 is a side elevation showing the parts in their normal position, Fig. 3 is a similar view but showing the rake frame disposed in an elevated and dumping position, Fig. 4 is a front end view of the loader, parts thereof being shown in their normal positions, Fig. 5 is a detail sectional view taken on the line 5—5 of Fig. 1, Fig. 6 is a detail perspective view of one of the latch pins. Fig. 7 is an enlarged perspective view of the forward end of the rake frame including the tiltable rake head.

Like reference numerals designate corresponding parts in all the figures of the drawings.

Referring to the drawings, the invention comprises a main frame which consists of side sills 5—5 and front and rear sills 6 and 7 respectively. Secured at the junctures of the side sills 5 and the front sill 6 are uprights 8—8 which are connected at their upper ends by a cross bar 9. Braces 10—10 are respectively connected to the sills 5 and to the upper ends of the uprights 8. The ends of the front sills 6 project beyond the side sills 5, and respectively connected to each end of the front sill and to the upper end of the respective upright 8 is an inclined brace 11. It will thus be observed that by means of these braces, the uprights 8 and consequently the cross bar 9, are held against either lateral or rearward tilting movement. The rear sill 7 also extends beyond the side sills 5, and attached to said projecting ends are draft elements 12—12 respectively to which horses may be readily attached. Secured to the projecting ends of the front sill 6 is a hold-back strap 13 adapted to be connected to a respective horse to retard the movement of the loader when going down hill or when desirous of backing. Secured to the sills 5 in rear of the front sill 6 is an axle 14, upon the outer ends of which are mounted ground wheels 15—15. Secured to the rear sill 7 are caster wheels 16—16 of any suitable type. The side sills 5 are connected by a plurality of cross bars 17 adapted for a purpose hereinafter fully explained.

My invention further comprises a rake frame which includes a pair of spaced side bars 18—18. These bars are disposed longitudinally with respect to the main frame, and are preferably disposed between the uprights 8. The rear ends of these bars are pivotally connected to the side sills 5 as indicated by the reference numerals 19—19, and the forward ends 20—20 of said bars project for some distance in advance of the main frame. Depending from the forward ends of these bars are U-shaped frames 21—21 and pivotally connected to the rear angle of these frames, as indicated by the reference numerals 22—22, is an angle bar 23. Laterally projecting from the angle bar is a series of rake teeth 24, and projecting upwardly from the angle bar and preferably at right angles to the rake teeth is a series of bars 25, the upper ends thereof being normally disposed above the side bars 18 and connected by a connecting bar 26. It will thus be observed that the rake which includes the teeth 24 and the upper bar 25 is mounted to tilt. In order to hold the rake teeth 24 in their normally horizontal position, there is mounted upon each of the side bars 18 a bracket 27, and upon each bracket is pivotally mounted a longitudinally disposed lever 28, which terminates at its forward end in an upwardly and forwardly extending hook 29 adapted for engagement with the connecting bar 26. A spring 30 is connected at its ends to the hook 29 and to the adjacent side bar 18 for normally holding said hook in engagement with said connecting bar. Cables 31—31 are each connected at one end to the rear end of a respective lever 28, and these cables extend rearwardly and are connected at their ends to a foot lever 32, which is disposed in close proximity to an operator's seat 33. In order to positively tilt the rake, there is provided a rearwardly extending handle 34, the rear end thereof being disposed in close proximity to the operator's seat 33.

After the rake has been loaded, with any material desired, the rake together with its frame is elevated by the following mechanism: Supported by certain of the cross braces 17 is a pair of standards 35—35, and in these standards is journaled a transversely disposed shaft 36. Keyed upon one end of this shaft is a pulley 37, which is driven by means of a belt 38 from an engine 39 of any suitable type. Loosely mounted upon this shaft is a hoisting drum 40 which is formed at its inner end with a series of clutch teeth 41 adapted to engage similar teeth 42 formed on the pulley 37, and thereby rotate said drum. A hand lever 43 which is disposed upon the main frame in close proximity to the operator's seat 33 is connected by a suitable mechanism to the drum 30 so as to slide said drum along the shaft 30 in either direction.

Centrally secured to the cross bar 9 of the main frame is a block 44 through which a cable 45 is trained. One end of this cable is connected to the drum 40 and the other end is trained through a pulley 46, and has its end returned and connected to the block 44. The pulley 46 is connected to an eye 47 which is connected to the connecting bar 26 of the rake head by cables 48 or the like. It will thus be observed that upon movement in one direction of the hand lever 43, the drum 40 will be clutched with the pulley 37, and as a result, the cable 45 will be wound upon said drum, and thereby swing the side bars 18 of the rake frame upwardly. This rake frame is elevated to any desired height, and in order to retain the same in its elevated position previous to the dumping operation, there is pivotally mounted, as at 49, upon each of the uprights 8 of the main frame, a latch 50. A spring 51 is associated with each latch to normally hold the same outwardly so as to be automatically engaged with the side bars 18 of the rake frame when the said bars are elevated thereabove. In order to release the latches against the tension of their springs, there is provided cables 52—52, each cable being connected at one end to a respective latch 50. These cables are trained over suitable pulleys 53, and have their rear ends connected to a lever 54 mounted upon the main frame in close proximity to the operator's seat 33.

It will thus be observed that after the rake frame has been elevated to the proper position above the latches 50, the hand lever 43 is shifted to disengage the drum 40 from the pulley 37. Thereupon the rake frame will drop and the side bars 18 thereof will seat themselves upon the latches 50. After a wagon or other suitable conveyance has been drawn under the rake, the hooks 29 are disengaged from the connecting bar 26 and the rake head by the foot lever 32, and as a result, the weight of the material upon the rake teeth will cause the said teeth to swing downwardly in a manner above noted. The handle 34 of the rake head will be held by the operator, and after the material has been dumped, the rake head is returned to its normal position, whereupon the hooks 29 will be engaged with the connecting bar 26, and thereby retain the rake head in its normal position to be reloaded. The latches 50 are then disengaged by the lever 54, and as a result, the rake head will tend to drop down by reason of its own weight. In order to check the downward movement thereof, the drum 40 is provided with a friction brake 55 of any suitable type and operated by a foot lever 56.

What is claimed is:

1. In a loader, a main frame, a rake frame supported thereon, a tiltable rake head supported by the frame, latching devices to hold said head against tilting movement, elevating means for said rake head, spring latches carried by the main frame for supporting the rake frame in its elevated position, and independent controlling means for each of said latches.

2. In a manure loader, a main frame including spaced uprights and a cross bar, a rake frame supported upon the main frame, a tiltable rake head supported by said rake frame, means to control the tilting movement of said head, a driving shaft mounted on the main frame, a driven pulley keyed upon the shaft, a hoisting drum loosely mounted upon the shaft and adapted in one position to interlock with said pulley, a block supported by cross bar, a cable connected at one end to the drum and trained over the block and having connection with the rake head, and means for controlling the movement of the drum along the shaft.

3. In a loader, a main frame, a rake frame supported thereon, a rake head including an angle-bar pivotally connected to said rake frame, rake teeth extending from said angle bar, other bars connected to the angle bar and disposed at right angles to the teeth, a bar connecting the upper ends of the last mentioned bars, a latch carried by the rake frame and engageable with said connecting bar of the head to hold the latter against tilting movement, elevating means for said rake frame, and controlling means for said latch.

4. In a manure loader, a main frame including side sills, uprights respectively connected at the forward ends thereof, a cross bar connecting the upper ends of the uprights, a rake frame including spaced side bars respectively connected to the side sills of the main frame for swinging movements, said side bars extending in advance of the uprights, a tiltable rake head supported by the rake frame, a latching device carried by one side bar and engageable with the head to hold the latter against tilting movement, elevating means for the rake frame connected to the cross bar of the main frame, and controlling means for said latch.

In testimony whereof I affix my signature, in the presence of two witnesses.

VERNE HENSLEY.

Witnesses:
GEO. A. AGNEW,
J. W. VIEREGG.

---

Copies of this patent may be obtained for five cents each, by addressing the "Commissioner of Patents, Washington, D. C."